«12» United States Patent
Saïb et al.

(10) Patent No.: US 10,156,796 B2
(45) Date of Patent: Dec. 18, 2018

(54) METHOD FOR DETERMINING THE PARAMETERS OF AN IC MANUFACTURING PROCESS BY A DIFFERENTIAL PROCEDURE

(71) Applicant: ASELTA NANOGRAPHICS, Grenoble (FR)

(72) Inventors: Mohamed Saïb, Saint Martin d'Heres (FR); Patrick Schiavone, Villard-Bonnot (FR); Thiago Figueiro, Grenoble (FR)

(73) Assignee: ASELTA NANOGRAPHICS, Grenoble (FR)

( * ) Notice: Subject to any disclaimer, the term of this patent is extended or adjusted under 35 U.S.C. 154(b) by 77 days.

(21) Appl. No.: 15/310,731

(22) PCT Filed: Jun. 3, 2015

(86) PCT No.: PCT/EP2015/062334
§ 371 (c)(1),
(2) Date: Nov. 11, 2016

(87) PCT Pub. No.: WO2015/185598
PCT Pub. Date: Dec. 10, 2015

(65) Prior Publication Data
US 2017/0075225 A1 Mar. 16, 2017

(30) Foreign Application Priority Data

Jun. 3, 2014 (EP) ..................... 14305835

(51) Int. Cl.
*G06F 17/50* (2006.01)
*G03F 7/20* (2006.01)

(52) U.S. Cl.
CPC .......... *G03F 7/705* (2013.01); *G03F 7/70458* (2013.01); *G03F 7/70516* (2013.01);
(Continued)

(58) Field of Classification Search
CPC .. G03F 7/705; G03F 7/70516; G06F 17/5072; G06F 2217/12; G06F 2217/06
(Continued)

(56) References Cited

U.S. PATENT DOCUMENTS 6,033,814 A 3/2000 Burdorf et al.
6,463,403 B1 10/2002 Burdorf et al.
(Continued)

FOREIGN PATENT DOCUMENTS

EP 1 560 073 A2 8/2005
EP 2 952 963 A1 12/2015
WO 2011/128393 A1 10/2011

*Primary Examiner* — Sun Lin
(74) *Attorney, Agent, or Firm* — Baker & Hostetler LLP

(57) ABSTRACT

A method to easily determine parameters of a second process for manufacturing from parameters of a first process is provided. Metrics representative of differences between the first process and the second process are computed from a number of values of the parameters, which can be measured for the first process and the second process on a calibration layout, or which can be determined from pre-existing values for layouts or reference data for the first process and the second process by an interpolation/extrapolation procedure. A set of metrics are selected so that their combination gives a precise representation of the differences between the first process and the second process in all areas of a target design. Advantageously, the metrics are calculated as a product of convolution of the target design and a compound of a kernel function and a deformation function.

23 Claims, 11 Drawing Sheets

(52) U.S. Cl.
CPC ...... *G06F 17/5072* (2013.01); *G06F 2217/06* (2013.01); *G06F 2217/12* (2013.01)

(58) Field of Classification Search
USPC ..................................................... 716/54, 55
See application file for complete search history.

(56) References Cited

U.S. PATENT DOCUMENTS

| | | |
|---|---|---|
| 2009/0300573 A1 | 12/2009 | Cao et al. |
| 2017/0075225 A1* | 3/2017 | Saib et al. .......... G03F 7/70458 |
| 2017/0123322 A1* | 5/2017 | Saib et al. ................ G03F 1/36 |
| 2017/0315507 A1* | 11/2017 | Collings et al. ... H04Q 11/0005 |

* cited by examiner

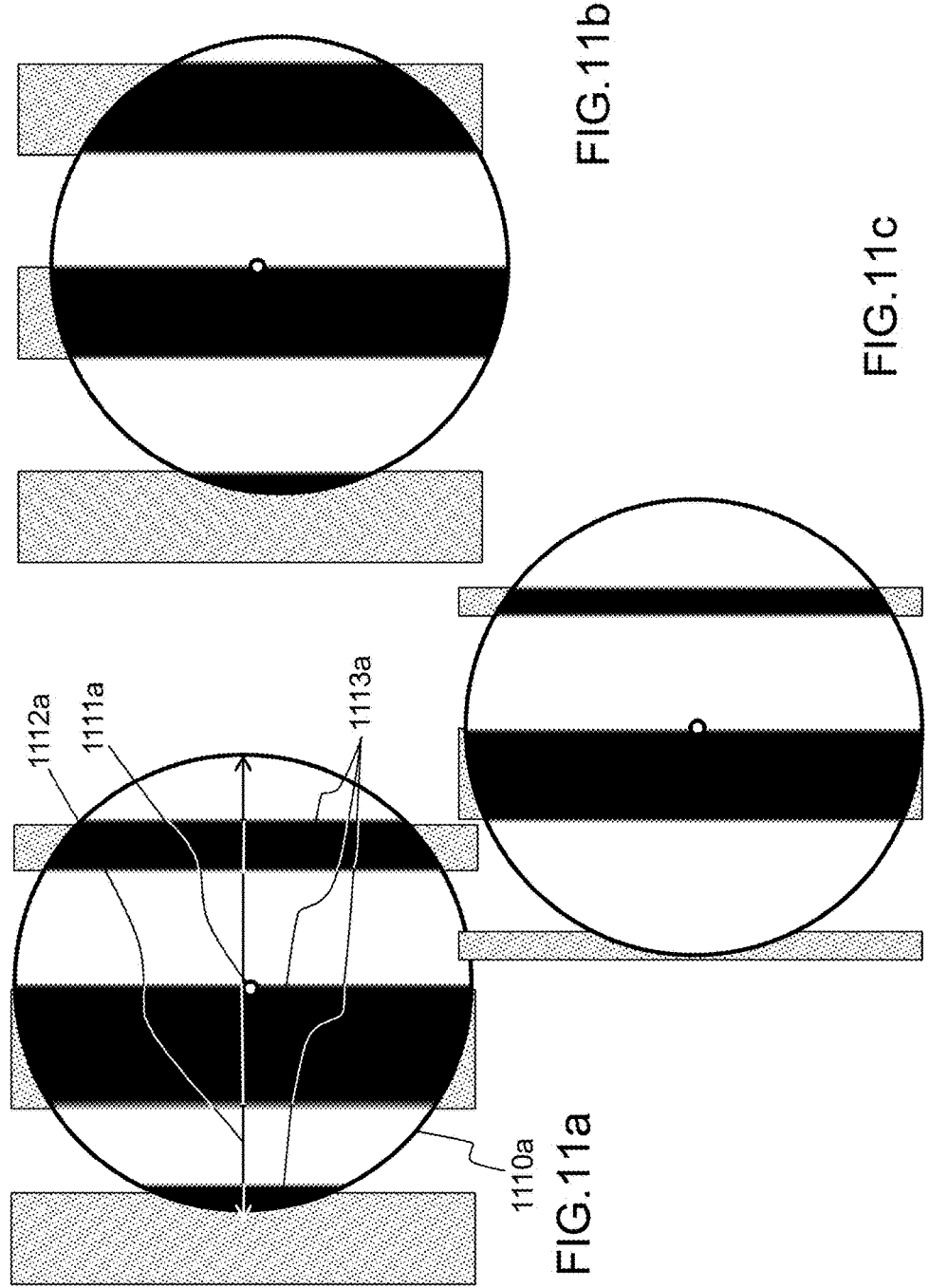

METHOD FOR DETERMINING THE PARAMETERS OF AN IC MANUFACTURING PROCESS BY A DIFFERENTIAL PROCEDURE

CROSS-REFERENCE TO RELATED APPLICATIONS

This application is a National Stage of International patent application PCT/EP2015/062334, filed on Jun. 3, 2015, which claims priority to foreign European patent application No. EP 14305835.2, filed on Jun. 3, 2014, the disclosures of which are incorporated by reference in their entirety.

FIELD OF THE INVENTION

The present invention notably applies to the field of electronic or optical lithography. It applies, among other processes, to mask write and direct write. It can also apply to other steps of semiconductor manufacturing processes, such as nanoimprint, DSA (Directed Self Assembly), etching, CMP (Chemical Mechanical Polishing/Planarization), annealing, baking, metrology, etc. . . .

BACKGROUND

During the process of mask write or direct write, several factors contribute to induce errors and prevent the achievement of the expected resolution. Some of these factors are the electron scattering (forward and backward), resist diffusion, resist thickness, etching, flare, fogging, metrology, etc. In order to improve the resolution and reduce the impact of these phenomena, there are several strategies of proximity effect correction (PEC), fogging effect correction (FEC), etching compensation, among others. The strategies are based on a prediction of the impact of each effect of a correction of these by means of dose and/or geometry compensation. Therefore, the quality of the correction depends upon the quality of the models used to predict the phenomena, said models being different from one manufacturing process to another. High precision of the model and the corrections can certainly be obtained, but at a high computation cost.

A problem is that, in any production flow, it is necessary to change the process from time to time. This may come from the purchase of new equipment, new resists, etc. In many cases maintaining identical behavior from the previous flow is desirable. In the prior art, this is achieved by tuning the process conditions. The physical process parameters (etch bias, power, resist thickness, bake, etc . . . ) are changed which is time consuming and quite costly.

Solutions for alleviating this burden have been found in the context of optical proximity effect correction (OPC). Some of these solutions are disclosed by U.S. Pat. Nos. 6,033,814 and 6,463,403. The basic idea of these methods of the prior art is to calibrate the two distinct models, one for the original process and the second for the new process, the output of which have to be matched to those of the original process. Once the two calibrations have been performed, it is necessary to alter the target of the original process into those of the new process using the two calibrated models. Several calculation procedures (two calibrations, one simulation and one correction) have to be run, which is still quite burdensome and computation heavy.

SUMMARY OF THE INVENTION

The invention alleviates the burden and the computing workload by implementing a single differential model, which allows a process to mimic the other, therefore reducing the calibration and correction effort. Moreover, using the process matching method gives more flexibility to achieve a desired result by allowing to impose constraints to the matching process, for instance to retain a matching result, when the measurements points which are used are not well scattered across the whole design, or to perform one of an interpolation and an extrapolation between measurements, or to impose a linearity on a parameter.

To this effect, the invention discloses a method of determining, by a computer, an output vector comprising at least an output variable, said output vector defining corrections to be applied to at least a feature of a second process for manufacturing a semiconductor integrated circuit, said method being characterized in that it comprises: obtaining a first series of values of an input vector for a first process for manufacturing the same semiconductor integrated circuit at a first plurality of points of a first layout, said input vector comprising at least an input variable; obtaining a second series of values of the at least a component of the input vector for the second process at one of the same first plurality of points on the first layout and a second plurality of points on a second layout; determining values of a state vector comprising at least a state variable, said state vector representative of a state of differences between the first and the second series of values of the input vector; obtaining by a direct calculation the output vector for the series of values of the state vector.

Advantageously, the first process is a virtual process, the virtual process producing an output layout identical to an input layout.

Advantageously, the output vector comprises as output variables at least one of an edge displacement, a dose modulation and a combination thereof.

Advantageously, the input vector comprises as input variables at least one of a CD and space of an input design of the integrated circuit.

Advantageously, the first layout is a calibration layout.

Advantageously, the first process is a reference process.

Advantageously, the series of values of the state vector are calculated at the output of at least one of an interpolation and an extrapolation procedure using the first series and the second series of values of the input vector.

Advantageously, a first state variable is selected based on its discriminatory power for the at least a component of the parameters vector on a domain of values where the first and second processes are to be used.

Advantageously, at least a second state variable is added to the first state variable to increase the combined discriminatory power within a defined computing load budget.

Advantageously, the state vectors comprises state variables which are representative of at least one of CD, space and density.

Advantageously, a state variable representative of CD is calculated by: determining a disk tangential and internal to a first edge of a portion of a design; determining a surface of a portion of the disk included between the first edge of the portion of the design and a second edge of the portion of the design; computing the state variable representative of CD as a ratio of the surface of the portion of the disk to a surface of the disk.

Advantageously, a state variable representative of space is calculated by: determining a disk tangential and external to an edge of a first portion of a design facing a next second portion of the design; determining a surface of a portion of the disk included between the edge of the first portion of the design and the edge of the second portion of the design;

computing the state variable representative of space as a ratio of the surface of the portion of the disk to a surface of the disk.

Advantageously, the state variable representative of long range density is calculated by: determining a disk covering a plurality of portions of a design; determining a surface of portions of the disk included in portions of the design; computing the state variable representative of long range density as a ratio of the surface of the portions of the disk to a surface of the disk.

Advantageously, the state vector includes state variables which are representative of at least one of an external density and an internal density.

Advantageously, the external density is calculated as a product of convolution on a visibility domain of a target design with a compound of a kernel function, centered on at least a point of interest and depending on a radius of visibility, and a deformation function depending on an angle of visibility and a selected shift angle, wherein said shift angle is selected so that the kernel function is looking at the outside of the target design.

Advantageously, the internal density is calculated as a product of convolution on a visibility domain of a target design with a compound of a kernel function, centered on at least a point of interest and depending on a radius of visibility, and a deformation function depending on an angle of visibility and a selected shift angle, wherein said shift angle is selected so that the kernel function is looking at the inside of the target design.

Advantageously, the at least an output variable is an edge displacement which is transformed into a dose modulation using a transformation function.

Advantageously, the transformation function is one of a hat function, a rectangular function, a triangular function and a Gaussian function.

Advantageously, the transformation function is a hat function defined by a parameter $W_h$.

Advantageously, the parameter $W_h$ is determined to satisfy $W_h \geq Max(abs(\Delta Edge))$ and $W_h \leq minShapeDistance$, where $\Delta Edge$ is calculated as a difference of Edge values obtained from the first series and second series of values and ShapeDistance is a measured on the target layout.

Advantageously, values Th of percentages of a resist threshold are calculated using a formula $Th=0.5-\Delta Edge/W_h$.

The invention also discloses a computer program for determining a series of corrections to be applied to at least a second parameter of a second process for manufacturing a semiconductor integrated circuit, said computer program being characterized in that it comprises computer code instructions configured for: Obtaining a first series of values of an input vector for a first process for manufacturing the same semiconductor integrated circuit at a first plurality of points of a first layout, said input vector comprising at least an input variable; obtaining a second series of values of the at least a component of the input vector for the second process at one of the same first plurality of points on the first layout and a second plurality of points on a second layout; determining values of a state vector comprising at least a state variable, said state vector representative of a state of differences between the first and the second series of values of the input vector; obtaining by a direct calculation the output vector for the series of values of the state vector.

The invention also discloses a semiconductor manufacturing equipment configured to use at least an output of a computer program according to claim 21, said semiconductor manufacturing equipment configured for one of direct writing on semiconductor wafers, writing on a mask plate, etching, chemically or mechanically planarizing, or baking, annealing a semiconductor wafer, and inspecting a mask or semiconductor surface.

Another advantage of the invention is that only a number of measurements with their respective exposure conditions are needed to perform the matching. Still, another advantage of the invention is that it is possible to match two processes, while handling one or both of them as black boxes. This is very useful when a mask shop wants to build masks identical of the ones provided by another mask shop, which will not give access to the internals of its processes. Another advantage is that matching a second process to a first process produces data which can be used to perform the reverse matching (first process to a second process). Another advantage is that, when a calibration step is performed before a process matching step, various options are available, depending on a compromise between precision and cost: a single calibration layout to which both processes are applied to gather metrology results from both sources; using the results of two different calibration layouts; using measurements performed on actual design targets from the source and the target processes.

It is also an advantage of the invention that it is not necessary to use functional models of the various process steps, which have then to be inverted to produce simulation results which have to match a tolerance criterium before being input to a correction step of a lithography process.

In some embodiments of the invention, geometry corrections to be applied to an input layout to can be defined directly (i.e. without any model inversion) by considering an ideal reference process: the ideal process is the one which produces a target layout which is identical to the input layout. The method of the invention directly generates the corrections to be applied to the geometry of the input layout to produce the target layout.

BRIEF DESCRIPTION OF THE DRAWINGS

The invention will be better understood and its various features and advantages will become apparent from the description of various embodiments and of the following appended figures:

FIGS. 11*a*, 11*b* and 11*c* illustrate the use of a Density metric/state variable with the layouts of FIG. 8

DETAILED DESCRIPTION

Figure 1:
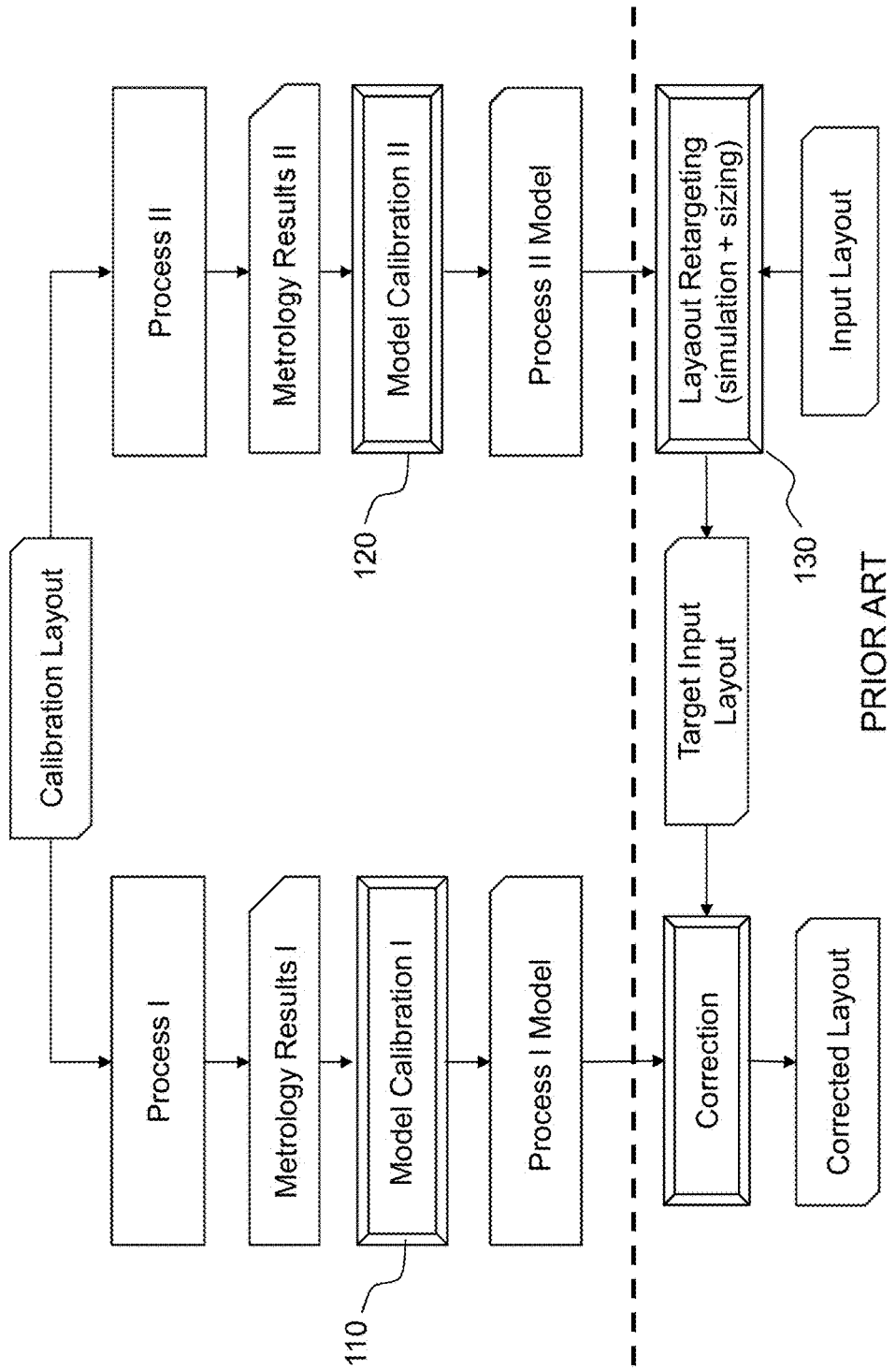
FIG. 1 represents a flow chart of a method of matching a second process to a first process in the prior art.

FIG. 1 represents a flow chart of a method of matching a second process to a first process in the prior art.

In the prior art, represented by the two cited US patents of Burdoff, two calibration steps have to be performed, the first one, 110, for the process in use (Process I), the second one, 120, for the new process (Process II). Then, a step of layout retargeting, 130, is performed so that Process II produces a layout which is equivalent to the one produced by Process I. This process of the prior art therefore comprises three complex steps, This is one of the reasons why the method of the invention is advantageous.

Figure 2:
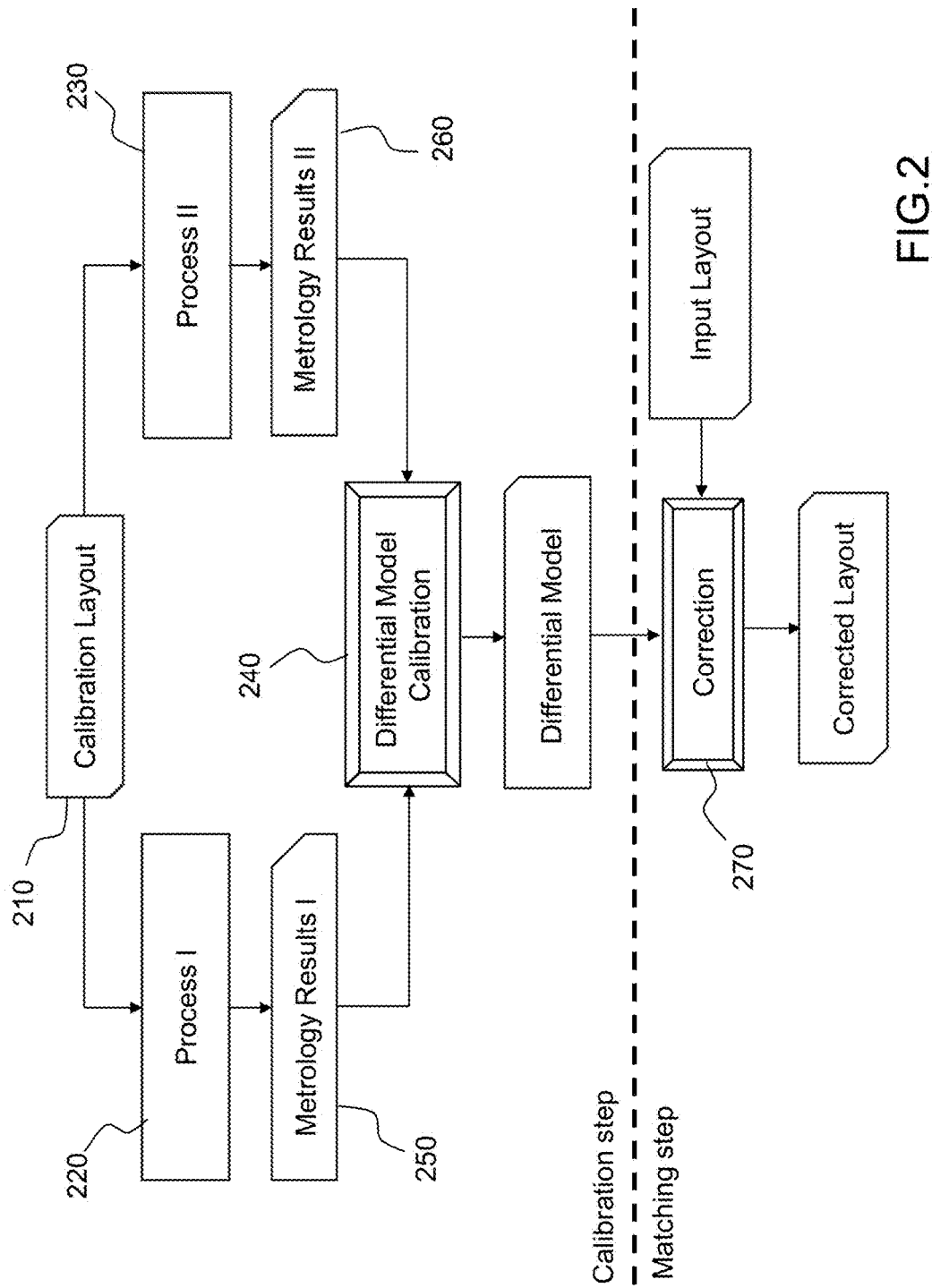
FIG. 2 represents a flow chart of a process matching method using a single calibration layout in a number of embodiments of the invention.

FIG. 2 represents a flow chart of a process matching method using a calibration layout in a number of embodiments of the invention.

The strategy consists in using measurements from both processes and then to calibrate a differential model that allows one process to mimic the other. In this approach, no other information is required from the processes being matched other than the metrology results. It is important to note that this approach also presents the advantage of allowing both processes to match each other using a single model, with no extra effort.

The first step 210 is to define a calibration layout, which may depend on the dominant features of the designs for which the processes to be matched 220, 230 are being used. For instance, if the process is mostly used for reproducing Manhattan designs with dense lines, preferably the calibration layout should include dense lines. Likewise, if the process is mostly used for dense or scattered free form designs. Optionally, it is not necessary to define a calibration layout. It is possible to use the metrology results or simulations of running the two processes to be matched on the target design.

The key step 240 of the method of the invention is to calibrate a differential model on the results 250, 260 of the two processes 220, 230.

The resulting model can then be applied in a correction flow 270 using different types of process matching strategies. For instance, a combined dose and geometry modulation can be applied, as the one disclosed in the European patent application no. 2559054 licensed to the applicant of the instant application. Also, such a combined dose and geometry modulation correction process can be applied on the target design as disclosed in the French patent application filed under no. 10/52862.

We now describe in more details the differential model calibration step 240.

A process for manufacturing semiconductor ICs is characterized by a number of variables which can be more or less important depending on the manufacturing steps and the type of target designs. When modeling the process effects, some variables will be chosen in the space domain, like Critical Dimension (CD), Space, Edge, Density. Some other will be chosen in the electron beam dose domain (for instance, resist threshold). Roughness of the contour can also be used, specifically when free-from designs are within the field of use of the process.

It can therefore be advantageous to represent the output variables to be a function of a vector. This vector will have as components the variables which have to be used, so that the differences between the processes throughout their field of use are well represented. Some of the variables will define the state of the model (CD, Space, Density, for instance). These variables can be named "state variables" or metrics, and will define a "state vector". Some other will define the differential output of the model (Edge displacement, Dose variation, combination of both, etc . . . ). These variables will be named "output variables" and will define an "output vector".

The differential model can be advantageously calibrated from measurements on a calibration layout, which define "input variables" and can be grouped in an "input vector". Input variables can also be CD, Space or other parameters, such as contour roughness (i.e. Line Edge Roughness—LER—or Line Width Roughness—LWR), or Line End Shortening—LES, Corner Rounding, etc. . . . The measurements must be made at a number of points which is high enough to cover the field of use and the location of the points must also be representative of the diversity of the sub-layouts. But the invention can also be carried out without using a calibration layout step, which is tedious and costly.

When using a calibration layout, a first series of values of the input vector (250) is measured at a number of metrology points, applying Process I (220) and a second series of values of the parameters (260) is measured at the same metrology points, applying Process II (230). Typically, the number of metrology points is of the order of 1000.

According to the invention, it is advantageous to define state variables, or "metrics", which are selected to be as representative as possible of the state of the differences of the input variables of the two processes throughout their field of use. Advantageously, the metrics will also be represented by a vector. The state vector can be constructed empirically by selecting a first component (for instance CD), testing the model, then adding a second one, a third one (for instance Space and Density), and so on, stopping the process when the increase in computing load reaches a predefined budget.

Examples of metrics are presented below in the description in relation with FIGS. 8 through 11.

Then, a step 270 is applied whereby the output vector determined by the differential model of the invention is applied to the data preparation file of Process I to derive the data preparation file of Process II.

In some instances, it may be advantageous to use variables of the dose domain in the correction algorithm. In this case, it will be advantageous to use a transformation function, which can be applied to the variables in the space domain. But a dose or a dose variation may directly be chosen as an output variable.

This transformation function can be a hat function, which is the simplest option. But other options are available: a rectangular function, a triangular function or a Gaussian function, among others, It is necessary that the transformation function, when compounded with the space function defining the target parameter (Edge displacement, sizing, etc . . . ) yields a dose ratio function which is defined in a finite interval. Therefore, the transformation function must be integrable (with a finite integral on the definition space) and monotonous by half-space. It may also be advantageous to use a transformation function which is symmetrical.

An example of an embodiment of such a transformation with a hat function is given below.

The width $W_h$ of the hat is calculated based on the characteristics of the target layout and on the differences of Critical Dimension (CD) or Edge at metrology points $MP_{i1}$ and $MP_{i2}$.

The first condition to be fulfilled is that the width of the hat function must be at least large enough to represent all edge placement differences between the two processes. Therefore, considering that, at metrology points $CD_{Process2}-CD_{Process1}=\Delta CD=\Delta Edge$, the width of the hat function $W_h$ must satisfy the following first inequality:

$$W_h \geq \text{Max}(\text{abs}(\Delta Edge)) \quad \text{(Eq. 1)}$$

Where Max is the maximum of the measurements at $MP_i$, the number and location of the measurements points being judiciously selected to give representative values.

In addition, the width of the hat function must be small enough to prevent two patterns to interact. Therefore, the width of the hat function $W_h$ must also satisfy the following second inequality:

$$W_h \leq \min(\text{ShapeDistance}) \quad \text{(Eq 2)}$$

Where ShapeDistance is the distance between adjacent patterns in the target layout.

As a consequence, a hat function can only be used as a PSF in the model when the two conditions above can be simultaneously satisfied, which means:

$$\max(\text{abs}(\Delta Edge)) \leq \min(\text{Space}) \quad \text{Eq. 3}$$

Whenever this condition cannot be satisfied, a different transformation function must be tried.

The threshold for any pattern whose difference is zero must be unchanged. In this case, should be kept as 0.5. Any differential difference must be translated into a threshold change, as presented below:

$$Th = 0.5 - \Delta Edge/W_h \quad \text{(Eq. 4)}$$

The values of the thresholds of the matched process can be determined from the difference in Edge value at a number of metrology points $MP_i$ for each pattern, as explained below on a numerical example.

Consider that the objective is to match Process 2 to Process 1. This means that we expect to perform an exposure using the Process 1 and obtain the same result that we would obtain by using Process 2. Note though that the calculation can be performed the other way round. Consider the targets/sets of measurements:

TABLE 1

| (A) Metrology Point | (B) Target CD (nm) | (C) Target Space (nm) | (D) CD with Process 1 (nm) | (E) CD with Process 2 (nm) |
| --- | --- | --- | --- | --- |
| MP1 | 60 | 60 | 65 | 62 |
| MP2 | 75 | 75 | 78 | 74 |
| MP3 | 90 | 180 | 90 | 80 |
| MP4 | 80 | 160 | 72 | 78 |
| MP5 | 100 | 200 | 85 | 94 |

The first step is to calculate the differences in CD, Edge (($\Delta CD$, $\Delta Edge$) between Process 1 and Process 2. The objective is to obtain the difference in edge placement: ($\Delta Edge$). Based on the values of columns (D) and (E) of Table 1, it is straightforward to compute $\Delta CD$ and $\Delta Edge$ at the selected metrology points.

$$W_h \geq \max(\text{abs}(\Delta Edge)) = 5 \text{ nm}$$

While the maximum value is given by:

$$W_h \leq \min(\text{space}) = 60 \text{ nm}$$

Therefore the width of the hat function may be any value between 5 nm and 60 nm. For this example, we arbitrarily set the value at 20 nm, but any value which fulfills the constraints of Eq. 1 and 2 would also work.

The second step is to translate each change in CD (nm) to a change in percentage of a threshold value in $\mu C/cm^2$. This is performed based on Eq. 3 applied to the values of column (F) of Table 2 below, which are the differences of the values of columns (D) and (E) of Table 1:

$$Th = 0.5 - \Delta Edge/W_h = 0.5 - \Delta Edge/20$$

TABLE 2

| (A) Metrology Point | (F) ΔEdge (nm) | (H) Threshold |
| --- | --- | --- |
| MP1 | −3 | 0.65 |
| MP2 | −4 | 0.7 |
| MP3 | −10 | 1 |
| MP4 | 6 | 0.2 |
| MP5 | 9 | 0.05 |

Thus, a transformation between parameters of the space domain to the dose domain is achieved.

Figure 3:
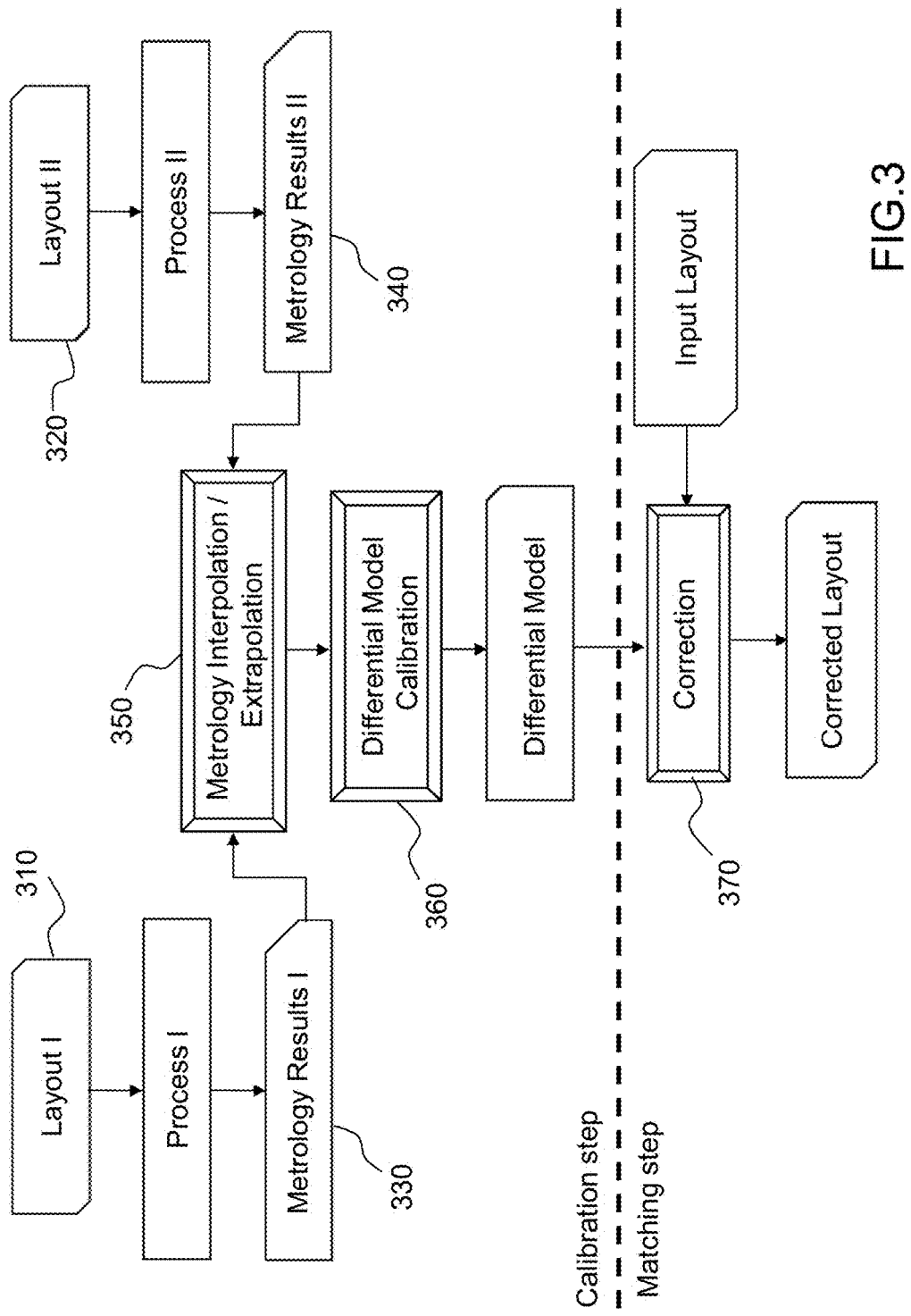
FIG. 3 represents a flow chart of a process matching method using two different layouts and an interpolation/extrapolation method in a number of embodiments of the invention.

FIG. 3 represents a flow chart of a process matching method using two different layouts and an interpolation/extrapolation method in a number of embodiments of the invention.

The use of a calibration layout can be cumbersome and costly. Instead, in a variant of the invention, it can be advantageous to use existing metrology results 330, 340, which have been obtained from two different layouts, 310 and 320.

Then, a step 350 to calculate the results of one of the metrology results of one of the layouts (340 or 330) at a set of metrology points of the other layout (330 or 340) is performed. Advantageously, this step is a combination of interpolations and extrapolations. This interpolation/extrapolation step can be linear or use a different function selected to take due account of the differences in the layouts. This step may introduce artifacts which will reduce the precision of the match and may have to be corrected. For instance, different sizing factors may be applied as correction, depending on the scale of the sub-parts of the design. Alternatively, the interpolation/extrapolation step can be applied to the state vector.

Then, a step 360 of differential model calibration is applied, including use of a metrics vector, as explained above.

Then, a step 370 of correction of the data preparation file of Process I is applied to obtain the parameters of Process II, as explained above.

One of the advantages of the variant of FIG. 3 is that it allows calibration of a differential model without a need to have access to confidential data about the two processes which have to be matched.

Figure 4:
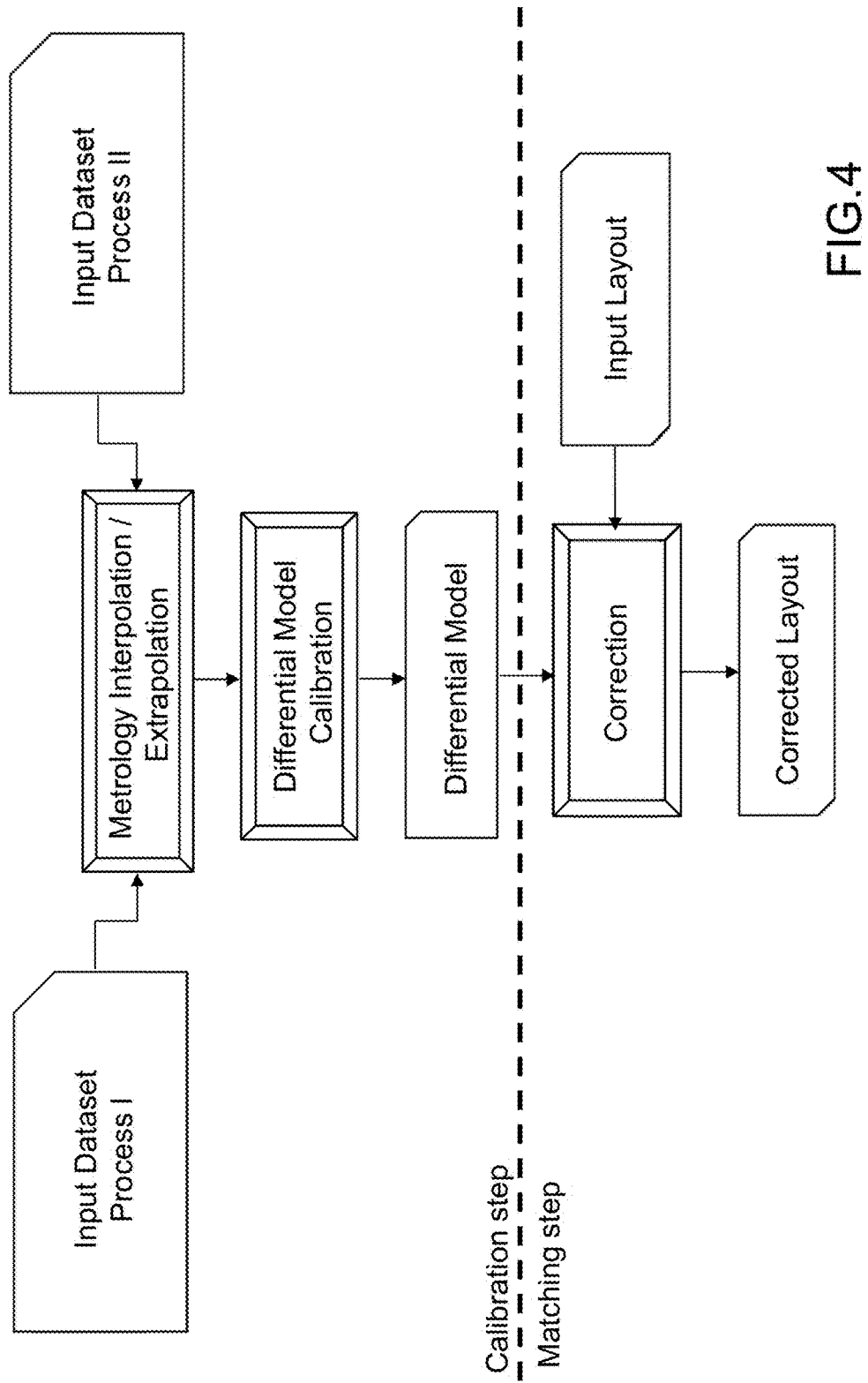
FIG. 4 represents a flow chart of a process matching method using two reference input datasets and an interpolation/extrapolation method in a number of embodiments of the invention.

FIG. 4 represents a flow chart of a process matching method using two reference input datasets and an interpolation/extrapolation method in a number of embodiments of the invention.

The embodiment of FIG. 4 is not very different from the embodiment of FIG. 3, except that in lieu of layouts, the method uses as input data from the two processes to be matched that may not even be metrology results. As examples, input data can be a set of data simulated from an already existing model. It can also be a linearity requirement such as the bounds of a CD vs pitch curve.

The interpolation/extrapolation step is performed between the input data of Process I and Process II, instead of the metrology results of two different layouts. A correction step may also be applied.

The differential model calibration step and the design correction step of the previous embodiments are performed in the same manner as described above.

Figure 5:
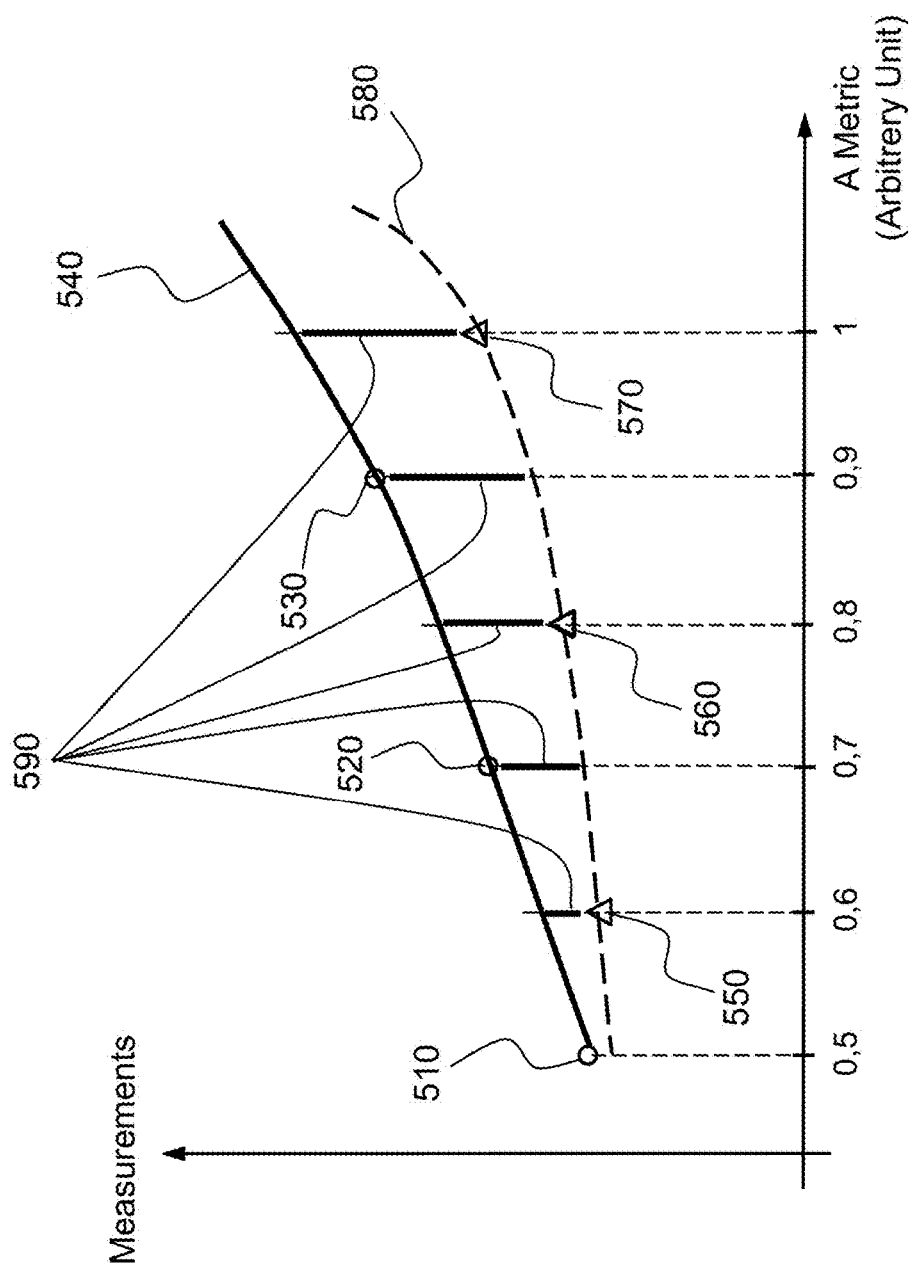
FIG. 5 illustrates an interpolation/extrapolation method in a number of embodiments of the invention.

FIG. 5 illustrates an interpolation/extrapolation method in a number of embodiments of the invention.

Measurements of a parameter for Process I are obtained, on a first layout or for reference data of this Process I, for a number of points 510, 520, 530. The best fit curve 540 of these measurements is calculated, using a known interpolation/extrapolation method.

Measurements of a parameter for Process II are obtained, on a second layout or for reference data of this Process II, for a number of points 550, 560, 570. The best fit curve 580 of these measurements is calculated, using a known interpolation/extrapolation method.

Then, the differential parameters 590 can be calculated at all the metrology points of Process I and Process II. And the calibration step 240 and 360 can be performed based on the differential measurements 590 and the metrics vector. Further the design correction steps 270, 370 can be applied.

Figure 6:
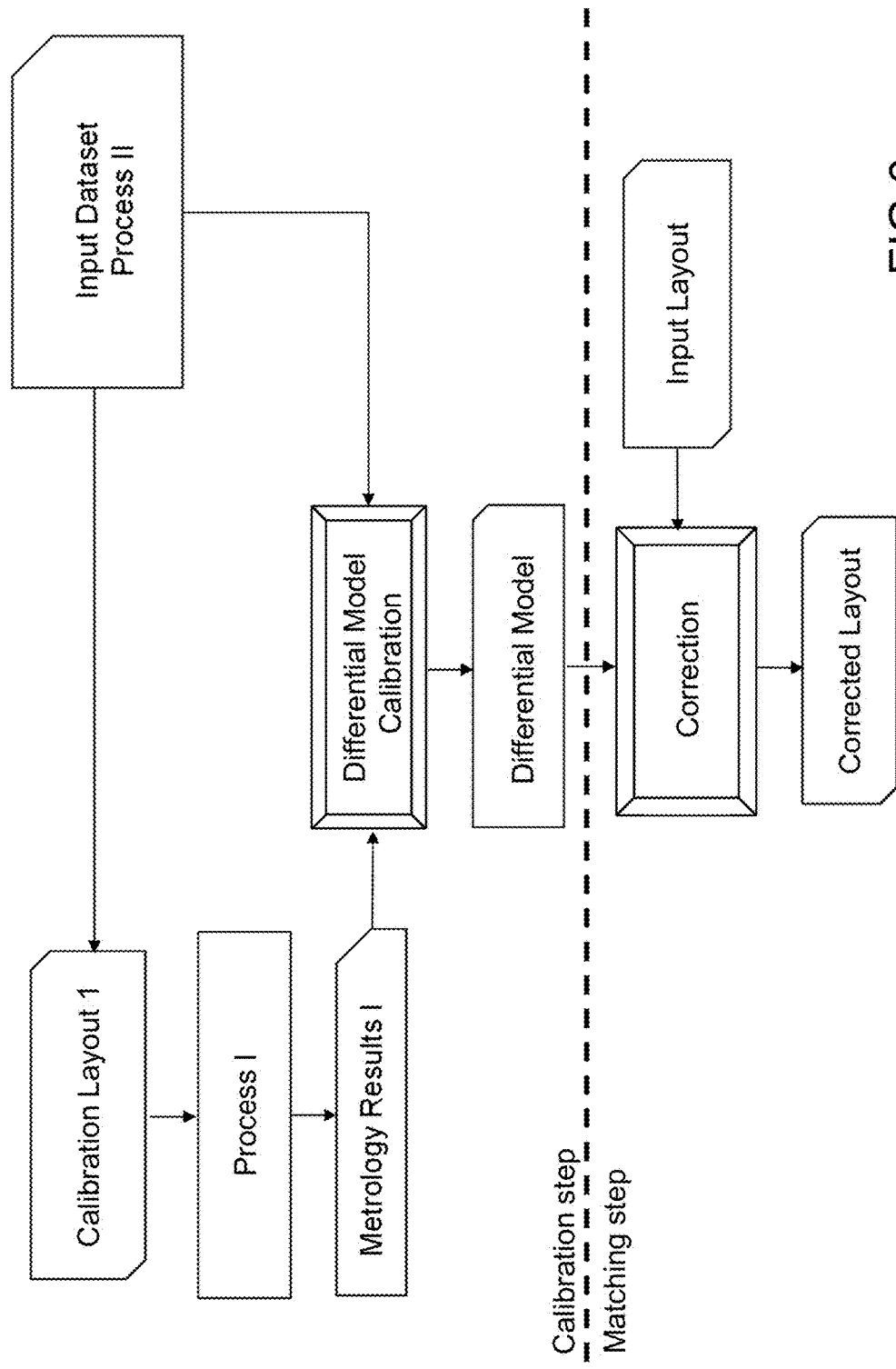
FIGS. 6 and 7 represent two flow charts of variants of the invention.
Figure 7:
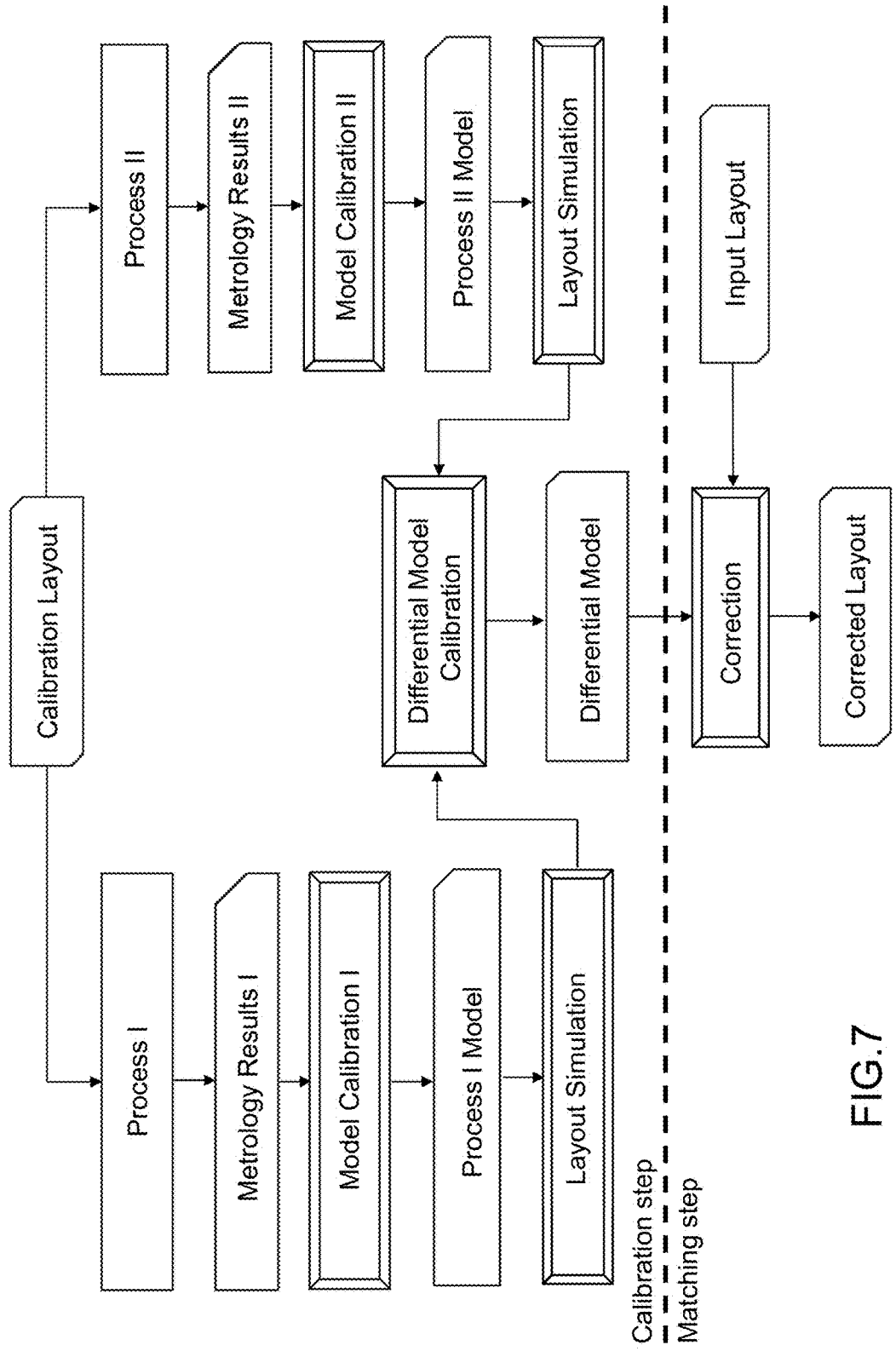

FIGS. 6 and 7 represent two flow charts of variants of the invention.

In the variant of FIG. 6, a calibration layout is used to obtain metrology results for Process I, and reference data of Process II are used.

The differential calibration step and the design correction step are applied in the same manner as described above.

In the variant of FIG. 7, a calibration layout is used to obtain metrology results for Process I and Process II.

Then, two different models are calibrated for Process I and Process II, or pre-existing calibration data may be re-used, and a differential model is then calibrated from the results of the calibration of the two models, using a metrics vector applied to the outputs of the calibration models of the two processes, instead of the metrology results.

A disadvantage of this variant is that it requires calibration of three models. But it has the potential of being more precise than the retargeting strategy of the prior art solution described in relation to FIG. 1. Also it has the potential of bringing less impact from outliers which may appear when using directly the results at the metrology points.

Figure 8:
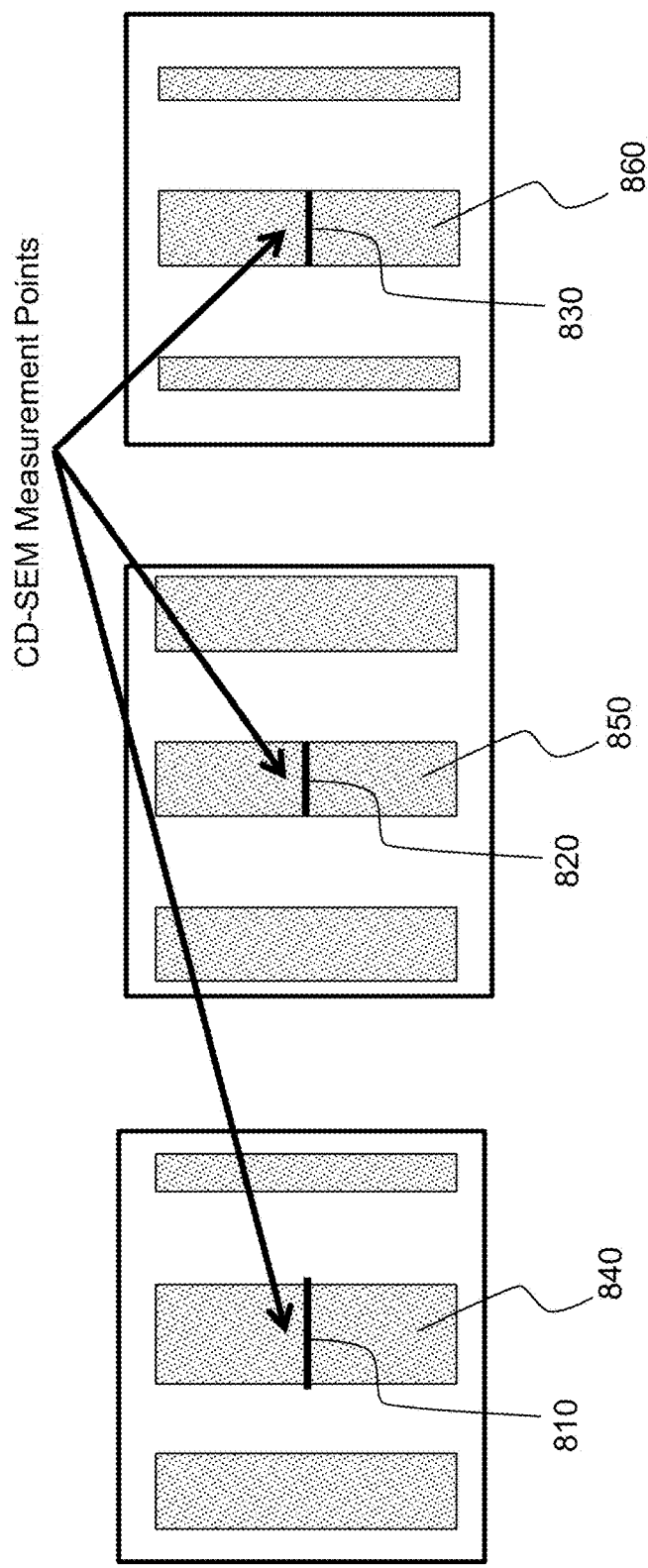
FIG. 8 illustrates three different layouts with measurement points.

FIG. 8 illustrates three different layouts with measurement points.

A scanning electron microscope (SEM) is used to measure the CDs 810, 820, 830 which characterize parts 840, 850, 860 of the layouts. More generally, metrology tools are used to measure parameters which are represented by characteristic dimensions of parts of layouts, such as CD, space or density. In this context, the CD is defined as the width of a line in a subpart of a design; the space is the width in-between two lines in a subpart of a design, or vice-versa, depending on the tone of the resist. The density is a measurement of lines to total surface of a design.

The figures which are now described illustrate a number of methods to perform said measurements. Also, the same physical parameters define metrics which can be used to model the input parameters.

Figure 9B:
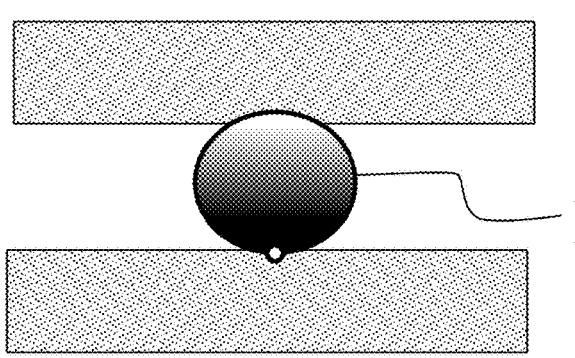
FIGS. 9a, 9b and 9c illustrate the use of a Space metric/state variable with the layouts of FIG. 8.
Figure 9C:
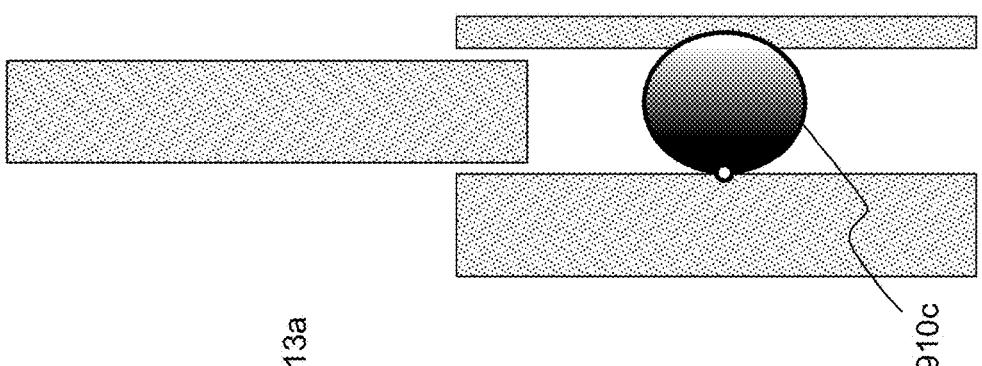
Figure 9A:
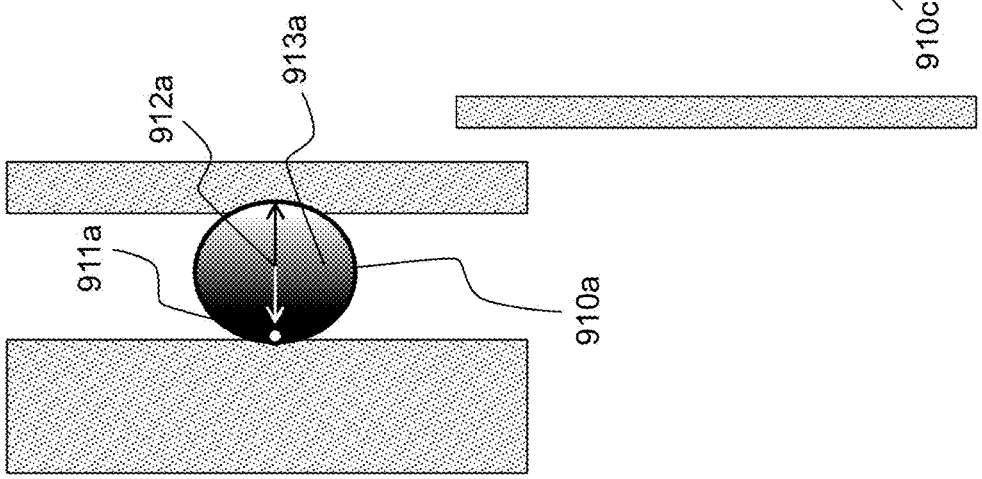

FIGS. 9a, 9b and 9c illustrate the use of a Space metric with the layouts of FIG. 8.

The Space metric takes due account of the density of the lines in the three different designs, 810, 820, 830 of FIG. 8. By way of example in the case of FIG. 810, a function is defined, at a point 911a of a line of the design, as a ratio of the interstitial surface 913a to the total surface 910a of a disk of diameter 912a which is tangential to the line. The observer at point 911a looks towards outside of the line. The largest the ratio, the wider the space between the lines. The examples of FIGS. 9a, 9b and 9c have approximately the same space of 80% roughly, even though the dimensions of the lines themselves are different. It can therefore be easily understood that a metrics vector which would only use Space would not be able to accurately represent the differences in design and therefore adapt two different processes to these differences.

Figure 10B:
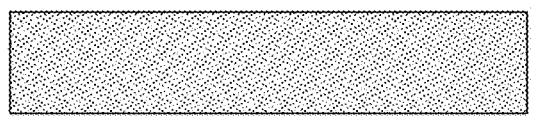
FIGS. 10a, 10b and 10c illustrate the use of a CD metric/state variable with the layouts of FIG. 8.
Figure 10B:
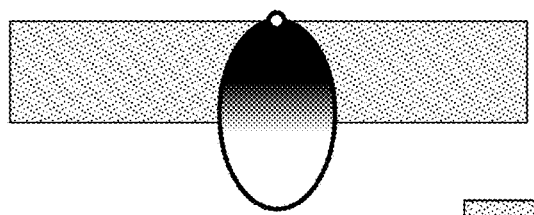
Figure 10B:
Figure 10C:
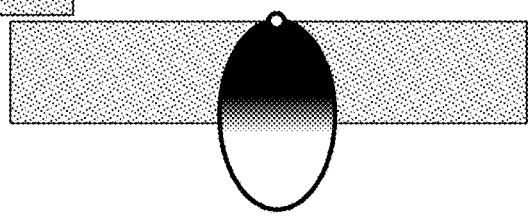
Figure 10A:
Figure 10A:
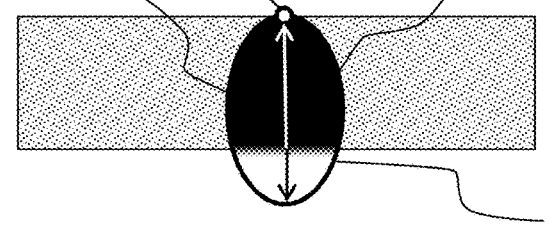
Figure 10A:
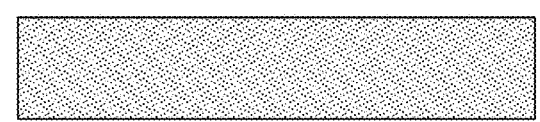

FIGS. 10a, 10b and 10c illustrate the use of a CD metric with the layouts of FIG. 8.

The CD metric takes due account of the density of the lines in the three different designs, 810, 820, 830 of FIG. 8. By way of example in the case of FIG. 810, a function is defined, at a point 1011a of a line of the design, as a ratio of the surface 1013a inside the line to the total surface 1010a of a disk of diameter 1012a which is tangential to the line. The observer at point 1011a looks inside the line. The largest the ratio, the wider the lines. The examples of FIGS. 10a, 10b and 10c have respectively CDs of 80%, 60%, 60% roughly. Therefore, adding this second dimension to the metrics vector will improve the differentiation of the design captured by the metrics vector.

FIGS. 11a, 11b and 11c illustrate the use of a Density metric with the layouts of FIG. 8.

The Density metric takes due account of the density of the lines in the three different designs, 810, 820, 830 of FIG. 8. By way of example in the case of FIG. 810, a function is defined, at a point 1111a of a line of the design, as a ratio of the three portions of surface 1113a inside the lines in this section of the design to the total surface 1110a of a disk of diameter 1112a which intersects the lines of this section of the design. The observer at point 1111a looks around the section of the design. The larger the ratio, the larger the density. The examples of FIGS. 11a, 11b and 11c have respectively Densities of 50%, 50%, 30% roughly. Therefore, adding this third dimension to the metrics vector will improve the differentiation of the design captured by the metrics vector.

The Space metrics illustrated by FIGS. 910a, 910b and 910c is identical for layout sections 810, 820 and 830 of FIG. 8. Adding the CD metrics allows differentiation of layout sections 810, on one hand, and 820 and 830, on the other hand. Adding then the Density metrics allows differentiation of layout sections 810 and 820, on one hand, and of layout section 830, on the other hand.

Indeed, CD, Space and Density are the input variables which are most often used to characterize a process to be able to calibrate a representative model.

Among a number of possible representations of the state variables of a target design viewed from a process, the ones which use the geometrical concept of "Kernel" bring some advantages since this concept can be used to define in relation to a set of patterns:

A surface between the patterns in the set, which is seen within an observation range from a point of interest outside the patterns; this surface can be seen as representative of an external density of the design and can be measured by one of the dimensions of the surface, which will be used through a ratio to the resist threshold to define the Space metrics, or vice-versa;

A surface in the patterns in the set, which is seen within an observation range from a point of interest inside the patterns; this surface can be seen as representative of an internal density of the design and can be measured by one of the dimensions of the surface, which will be used through a ratio to the resist threshold to define the CD metrics, or vice-versa.

Indications on how to calculate the metrics are explained in Park (J.-G. Park, S.-W. Kim, S.-B. Shim, S.-S. Suh, and H.-K. Oh (2011), 'The effective etch process proximity correction methodology for improving on chip CD variation in 20 nm node DRAM gate', Design for Manufacturability though Design-Process Integration V, proc. SPIE vol 7974).

Park also discloses a variant to the kernel metrics discussed above wherein an area of visibility is defined by sectors. This area of visibility allows the definition of an external and internal intersections to respectively determine the Space and CD metrics.

In this variant, an angle θ is defined as a parameter of the kernel. By way of example, the metrics can be calculated with the following formula:

$$\text{Density} = \frac{\iint_{InsideEdge} K(r) \cdot T(r, \theta) \cdot A(\theta) \cdot drd\theta}{\iint_{All} K(r) \cdot drd\theta}$$

Where:
K(r) is a Gaussian kernel;
T(r,θ) is the surface of the target design;
A(θ)) is a factor of deformation of the kernel by angle θ.

Other variants of the kernel model may be figured out to still improve the precision of the determination of the process metrics, without falling out of the scope of this invention.

A group of variants which are specifically advantageous are described in European patent application no EP 14305834.5 filed this same day by the same applicant as this application.

Specifically, in this invention is disclosed the use of a convolution on a visibility domain of the design by a compound of a kernel function and a deformation function, said deformation function depending on an angle of visibility and a shift angle. The use of a convolution function greatly alleviates the computation load.

The method of the invention may be used in many use cases where process matching using a differential model may be interesting, such as:

E-beam Direct Write or optical projection lithography on semiconductor wafer: the method of the invention may be used to absorb the changes in the fabrication, like a different resist or a new machine and provide the same results on wafer than with the original process;

Mask Write: the method of the invention may be used to absorb the changes in the mask writing flow, being able to provide identical printing masks from different flows; it is possible to take due account of wafer effects in the mask writing step by applying the variant of FIG. 4.

Inspection: sometimes it is more important to be consistent than accurate when it comes to metrology standard; using the process matching of the invention may allow different metrology systems to be calibrated to provide equivalent results;

Other steps of a semiconductor manufacturing process, such as etching, CMP annealing, for example.

The proposed strategy may be applied in a dose only or geometry only matching algorithm, which means that the input layout for a process would either have its doses or geometries adapted to match the other process or input dataset. Also, the strategy may combine a dose and geometry matching algorithm which is applied in a single step, for example as disclosed by European patent application published under no EP2559054, licensed to the assignee of the present application.

For calibrating the differential model, the only required information is the difference between two processes. It is not even necessary to access the measurement results from the two processes for the standard flow of FIG. 1.

Therefore, since it is not necessary to generate a model for each process, the processes may be considered as "black boxes", which allows matching processes from different companies, while keeping the internal of the processes confidential.

In addition, the generated differential model works both ways, which means that the very same model can be used to allow Process 1 to match Process 2 or Process 2 to match Process 1.

Also, since using two models (one for each process) creates two sets of associated errors, employing a single model allows a reduction of the compounded error.

In all the embodiments of the invention the flow charts of which are represented on FIGS. 2, 4, 6, and 7, Process I on the figures can be an ideal or perfect process, i.e. a process which always produces a target or output layout identical to the input layout.

In the embodiment of FIG. 2, Metrology Results I, 250, are defined as errors equal to zero nm at all points of the target layout. Likewise, in the embodiments of FIGS. 6 and 7. Therefore, the metrology data are virtual.

In the embodiment of FIG. 4, the Input Dataset of Process I is a also a dataset with null errors, i.e. where the metrics are defined at all points as the metrics of the target layout.

An advantage of using the invention to calculate the corrections to be applied to an actual process to match the results of a reference ideal process is that the geometry corrections to be applied to the input layout are determined directly at the output of the calculation. This is in contrast with the standard simulation approaches which are normally used to find an optimal solution within a defined tolerance. In these solutions it is necessary to invert the models used to determine the imprint in the resist of a defined input layout to find the geometry corrections to be applied to the latter to imprint the target layout in the resist. In practical terms, since these models are not generally invertible, it is necessary to apply a bootstrap method by calculating all solutions until one is found in the tolerance margin. This is a computer intensive, long and tedious process that is no longer needed when applying the invention with an ideal reference process.

It is also to be noted that the method of the invention gives the displacements to be applied at defined points of the target contour, where the CD, Space and Density metrics may be defined. This is in contrast with a classic calculation by a simulation approach where the model calculates the dose to be applied at all points of the target contour, even at points where the above metrics are not defined.

The examples disclosed in this specification are only illustrative of some embodiments of the invention. They do not in any manner limit the scope of said invention which is defined by the appended claims.

The invention claimed is:

1. A method of determining, by a computer, an output vector comprising at least an output variable, said output vector defining corrections to be applied to at least a feature of a second process for manufacturing a semiconductor integrated circuit, said method comprising:
   obtaining a first series of values of an input vector for a first process for manufacturing said semiconductor integrated circuit at a first plurality of points of a first layout, said input vector comprising at least an input variable;

obtaining a second series of values of at least a component of the input vector for the second process at one of said first plurality of points on the first layout and a second plurality of points on a second layout;

determining values of a state vector comprising at least a state variable, said state vector representative of a state of differences between the first series of values and the second series of values of the input vector; and obtaining, by a direct calculation, the output vector for series of values of the state vector.

2. The method of claim 1, wherein the first process is a virtual process, the virtual process producing an output layout identical to an input layout.

3. The method of claim 1, wherein the at least one output variable comprises at least one of an edge displacement, a dose modulation and a combination thereof.

4. The method of claim 3, wherein at least an output variable is an edge displacement which is transformed into a dose modulation using a transformation function.

5. The method of claim 4, wherein the transformation function is one of a hat function, a rectangular function, a triangular function and a Gaussian function.

6. The method of claim 5, wherein the transformation function is a hat function defined by a parameter $W_h$.

7. The method of claim 6, wherein the parameter $W_h$ is determined to satisfy $W_h \geq Max(abs(\Delta Edge))$ and $W_h \leq min\text{-}ShapeDistance$, where $\Delta Edge$ is calculated as differences of Edge values obtained from the first series of values and the second series of values, and ShapeDistance is a measured on the target layout.

8. The method of claim 7, wherein values Th of percentages of a resist threshold are calculated using a formula $Th=0,5-\Delta Edge/Wh_h$.

9. The method of claim 1, wherein the at least one input variable comprises as at least one of a CD and space of an input design of the semiconductor integrated circuit.

10. The method of claim 1, wherein the first layout is a calibration layout.

11. The method of claim 1, wherein the first process is a reference process.

12. The method of claim 1, wherein the series of values of the state vector are calculated at an output of at least one of an interpolation procedure and an extrapolation procedure using the first series of values of the input vector and the second series of values of the input vector.

13. The method of claim 1, wherein a first state variable is selected based on its discriminatory power for the at least a component of a parameter vector on a domain of values where the first process and the second process are to be used.

14. The method of claim 13, wherein at least a second state variable is added to the first state variable to increase the discriminatory power within a defined computing load budget.

15. The method of claim 14, wherein the state vectors comprises state variables which are representative of at least one of CD (critical dimension), space and density.

16. The method of claim 15, wherein a state variable representative of CD is calculated by: determining a disk tangential and internal to a first edge of a portion of a design; determining a surface of a portion of the disk included between the first edge of the portion of the design and a second edge of the portion of the design; and computing the state variable representative of CD as a ratio of the surface of the portion of the disk to a surface of the disk.

17. The method of claim 15, wherein a state variable representative of space is calculated by: determining a disk tangential and external to an edge of a first portion of a design facing a second portion of the design; determining a surface of a portion of the disk included between the edge of the first portion of the design and the edge of the second portion of the design; and computing the state variable representative of space as a ratio of the surface of the portion of the disk to a surface of the disk.

18. The method of claim 15, wherein the state variable representative of density is calculated by: determining a disk covering a plurality of portions of a design; determining a surface of portions of the disk included in portions of the design; and computing the state variable representative of density as a ratio of the surface of the portions of the disk to a surface of the disk.

19. The method of claim 14, wherein the state vector includes state variables which are representative of at least one of an external density and an internal density.

20. The method of claim 19, wherein the external density is calculated as a product of convolution on a visibility domain of a target design with a compound of a kernel function, centered on at least a point of interest and depending on a radius of visibility, and a deformation function depending on an angle of visibility and a selected shift angle, wherein said selected shift angle is selected so that the kernel function is looking at outside of the target design.

21. The method of claim 19, wherein the internal density is calculated as a product of convolution on a visibility domain of a target design with a compound of a kernel function, centered on at least a point of interest and depending on a radius of visibility, and a deformation function depending on an angle of visibility and a selected shift angle, wherein said selected shift angle is selected so that the kernel function is looking at inside of the target design.

22. A computer program for determining a series of corrections to be applied to at least a second parameter of a second process for manufacturing a semiconductor integrated circuit, said computer program including instructions that, when executed by a computer, cause the computer to perform actions comprising:

obtaining a first series of values of an input vector for a first process for manufacturing the semiconductor integrated circuit at a first plurality of points of a first layout, said input vector comprising at least an input variable;

obtaining a second series of values of at least a component of the input vector for the second process at one of said first plurality of points on the first layout and a second plurality of points on a second layout;

determining values of a state vector comprising at least a state variable, said state vector representative of a state of differences between the first series of values and the second series of values of the input vector; and obtaining by a direct calculation the output vector for series of values of the state vector.

23. A semiconductor manufacturing equipment configured to use at least an outcome of a computer program according to claim 22, said semiconductor manufacturing equipment configured for executing one of direct writing on semiconductor wafers, writing on a mask plate, etching, chemically or mechanically planarizing, or baking, annealing a semiconductor wafer, and inspecting a mask or semiconductor surface.

* * * * *